United States Patent Office 3,434,809
Patented Mar. 25, 1969

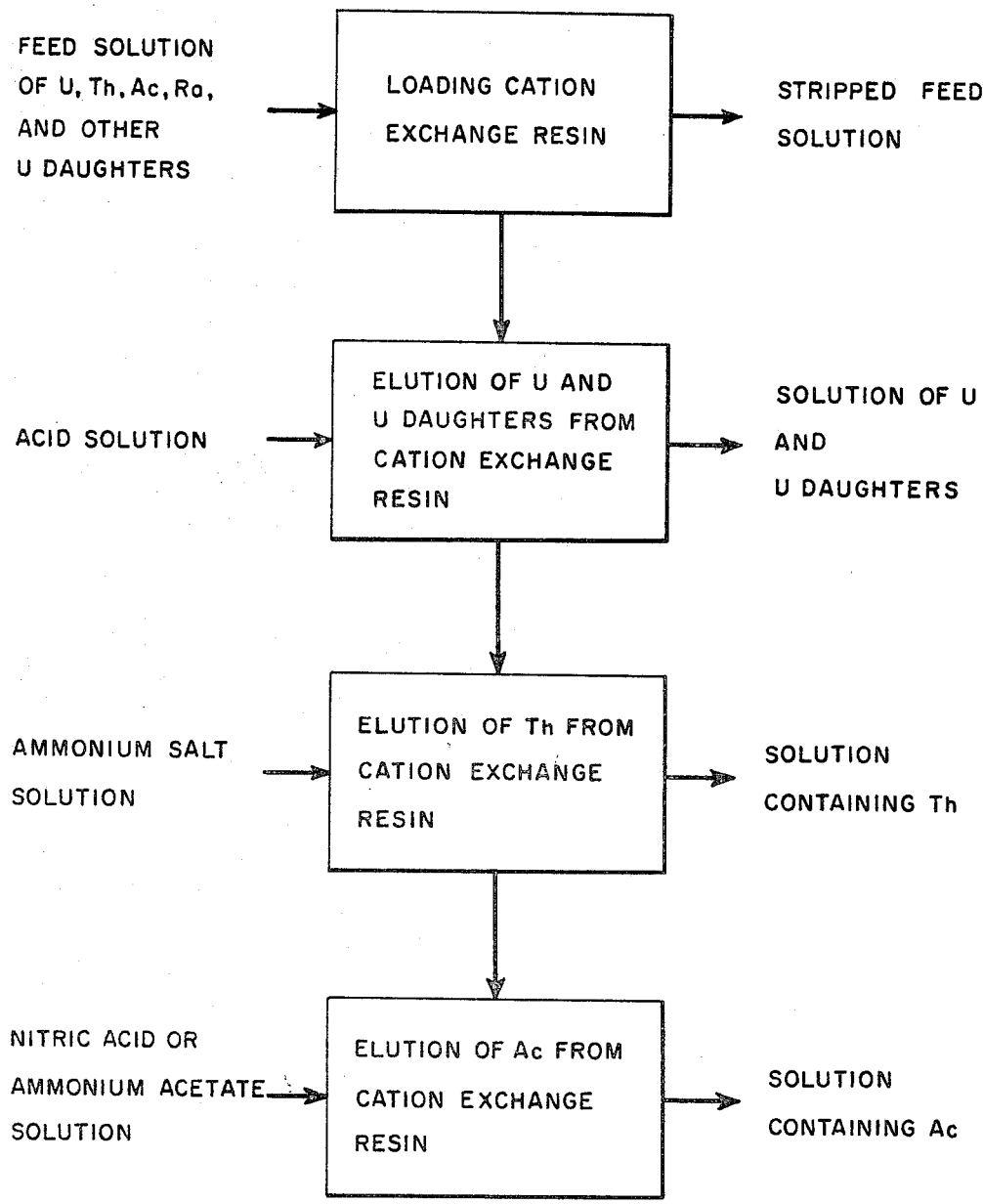

3,434,809
SEPARATION OF ACTINIUM AND THORIUM FROM URANIUM AND ITS DAUGHTERS
Donald H. Swanson, Miamisburg, Ohio, assignor to the United States of America as represented by the United States Atomic Energy Commission
Filed Mar. 15, 1968, Ser. No. 713,410
Int. Cl. C01f *13/00, 17/00;* C01g *43/00*
U.S. Cl. 23—338                3 Claims

ABSTRACT OF THE DISCLOSURE

An ion exchange process comprising loading a cation exchange resin with a solution including uranium, actinium, thorium and other uranium decay product cations, eluting cations other than thorium and actinium with a dilute acid solution, separately eluting thorium with an ammonium salt solution, and eluting actinium with a solution of strong acid or ammonium salt.

BACKGROUND OF INVENTION

Uranium isotopes, e.g., those used as nuclear fuel in reactor rods, decay to produce daughter products such as isotopes of thorium, radium, actinium, francium, bismuth, polonium, thallium, and lead. Non-radioactive impurities such as transition elements and boron may also be present. Some of these isotopes including thorium-228, thorium-229, and actinium-225 are useful for such as heat or alpha sources, or as tracer isotopes used for monitoring processes in industry and in living organisms.

Thus, on reprocessing reactor fuel rods it is desirable to separate actinium and thorium from the other uranium decay products or uranium daughters. Prior methods performing this separation have utilized a first process such as ion exchange to recover thorium followed by a second process such as precipitation or liquid extraction to separate actinium from other uranium daughters. The use of more than one type process complicates separation procedures and renders the separation time consuming.

Thorium may be conveniently and efficiently separated from other cations by an ion exchange process. The thorium ion ordinarily exists in the plus four oxidation state and is not as readily hydrated as other tetravalent cations which makes it readily absorbable by cation exchange resins. Separation of thorium from other elements and concentration of even trace amounts of thorium are thereby facilitated. However, prior processes which isolated thorium ions on a cation exchange resin by elution of other elements also washed away with the eluate actinium which may have been present.

SUMMARY OF INVENTION

It is therefore an object of the present invention to provide a new, improved, and timesaving process for separating thorium and actinium from uranium and its daughters.

It is a further object to provide a single ion exchange process for individually separating thorium and actinium from uranium and its daughters.

It is also an object to provide a method for carrying out the above separation which allows resin loading at room temperature.

Further objects and advantages will become apparent from the following description and embodiment of the invention.

The invention, as shown, comprises an ion exchange process for separating actinium and thorium from other uranium decay products, which includes eluting unwanted cations from a loaded cation exchange resin with an acid solution, recovering thorium in an ammonium salt solution, and subsequently eluting actinium in a solution of nitric acid or ammonium acetate.

DESCRIPTION OF THE DRAWING

The drawing is a flow diagram illustrating features of the present invention.

DETAILED DESCRIPTION

In one manner of performing the separation of the present invention a sulfonated hydrocarbon cation exchange resin such as polystyrene cross-linked with about eight percent divinylbenzene, or other organic cation exchange resins or materials such as carboxylated or chelated hydrocarbons, may be contained in a suitable vessel or ion exchange column having a heating jacket. The resin may be charged or loaded with a dilute acid solution of uranium, uranium decay products, and other non-radioactive impurities such as the transition elements and boron. The dilute acid solution in which these elements or cations, both radioactive and nonradioactive, are dissolved may be an aqueous solution of about one to two molar inorganic acid such as hydrochloric or nitric. A dilute acid solution may enhance solubility by prevention of insoluble hydroxide formation. Also certain heavy elements present may form complexes with hydrogen chloride or chloride ions which contribute to their solubility as well as impede absorption on the cation exchange resin. A preliminary separation may thereby be effected during loading of the column.

The feed solution may be pumped or allowed to gravitate through and onto the cation exchange resin to allow substantially all of the actinium and thorium ions to be absorbed or loaded thereon. A portion of the uranium, uranium daughters, and non-radioactive inmpurities may also be absorbed while a portion may discharge from the ion exchange column with the stripped feed solution effecting a preliminary separation as mentioned. If desired, the resin may be heated to about 50° C. to 80° C. to inelution will likewise be facilitated by the elevated temperature. However, in some cases it may be preferable to load the resin at room or ambient temperatures with certain process steps which will be specifically set forth below in Example 1.

After loading, the uranium, uranium daughters, and non-radioactive inpurities may be eluted or washed from the resin with a first inorganic acid solution having low acid concentration, leaving thorium and actinium absorbed thereon. It may be desirable, however, to subdivide this first acid elution into two or more separate steps, as will now be brought out.

As a first step, the resin may be eluted or washed with an about one or two molar hydrochloric or nitric acid solution. As discussed above some of the elements which are to be eluted form hydrogen chloride or chloride complexes thus enhancing solubility and facilitating elution from the cation exchange resin. However, radium cations are not readily eluted by dilute hydrochloric acid and may be more effectively washed from the cation exchange resin with a slightly more concentrated nitric acid solution, such as about two to three molar. Use of about one molar nitric acid may remove traces of uranium left on the resin without eluting the radium. Actinium ions may begin to enter the elutriant or wash solution at nitric acid concentrations approaching four molar such that the volume of about three molar nitric acid washing should be minimized. It therefore may be desirable to conduct a first wash step with about one to two molar nitric or hydrochloric acid followed by a subsequent wash step with about two to three molar nitric acid, although a one step elution with about one to three molar nitric acid may be used accompanied by a somewhat less effective separation.

The initial wash step with about one to two molar hydrochloric acid (or nitric acid) may be continued until no uranium is detectable in the eluate with alpha pulse height analysis. The hydrochloric acid may then be allowed to drain from the resin so as not to dilute the subsequent two to three molar nitric acid wash. A distilled water wash may follow to rinse the hydrochloric acid from the resin. Subsequent elution of the radium cation with the nitric acid solution may be facilitated by heating and maintaining the resin at about 50° C. to 80° C. The nitric acid wash may be continued until no radium is detectable in the eluate or discharged wash solution by alpha pulse height analysis or until actinium begins to elute.

Purified or segregated thorium ions may subsequently be separated eluted from the resin with an ammonium salt solution such as about one molar or less ammonium acetate. Other elutriants such as citric acid or ammonium citrate may be used with slightly less effective results. It has been found that a solution of about 0.5 molar ammonium acetate is especially effective for this recovery. The ammonium acetate solution may have a pH of about 2.5 to 4.0 with optimum pH of about 3.9. Acetic acid may be added to the ammonium acetate solution to adjust its pH or acidity to the desired level. It may also be desired to precede thorium elution by washing the resin with distilled water to remove any trapped or retained acidic tailings. If desired and especially if the elutriant chosen is other than an ammonium solution, the resin may be preliminarily washed with a solution of about one molar ammonium nitrate to change the resin to the ammonium form as well as to remove residual acid. The elution of thorium with ammonium acetate may then proceed until no thorium can be detected in the eluate discharged from the resin by alpha pulse height analysis.

Segregated or purified actinium may finally be eluted from the resin with a second, strong inorganic acid solution such as about four to eight molar nitric acid. The acid wash may be continued until actinium is no longer detectable in the eluate by alpha pulse height analysis. Eight molar acid satisfactorily recovers all of the original actinium within measurable limits while a somewhat less effective recovery is provided with a four molar nitric acid elutriant. It should be recognized that if desired the actinium elution may be conducted prior to eluting the thorium from the resin.

As an alternative, uranium and certain of its decay products may be eluted from the charged column with a hydrochloric acid solution followed by a one molar, rather than two to three molar, nitric acid solution leaving thorium, actinium and radium absorbed on the resin. Thorium may be eluted with an about one molar ammonium acetate solution essentially as described above. A subsequent, more voluminous about one molar ammonium acetate purge may then be used to remove the actinium and radium from the resin. Example three below gives one set of relative volumes which may be used to effect a separation in this manner.

As another alternative, this process is easily adaptable to the recovery of radium and actinium. The resin may be loaded with a solution of uranium, its daughters, and hydrochloric acid followed by a water wash. All elements other than radium and actinium may be removed with an ammonium acetate solution. Radium may then be eluted with about two molar nitric acid and subsequently actinium may be eluted with four to eight molar nitric acid.

Example 1

A sulfonated hydrocarbon cation exchange resin is loaded at room temperature with an aqueous, about 1.5 molar hydrochloric acid solution containing actinium, thorium, uranium, uranium daughters, and non-radioactive impurities. The resin is next washed with aqueous about one molar hydrochloric acid until uranium is no longer detectable in the eluate. Then, the resin is purged with two column volumes of distilled water to remove the hydrochloric acid. The resin is heated to about 60° C. followed by elution with aqueous about two molar nitric acid to remove other cations until radium is no longer detectable by alpha pulse height analysis. The resin is again purged with distilled water to remove the nitric acid followed by a wash of ammonium acetate having a pH of about 3.9 to elute thorium. A final wash with about eight molar nitric acid is continued until actinium is no longer detectable in the wash solution discharged from the exchange column.

Example 2

A cation exchange column, of about 39 centimeters long and 8 millimeters in diameter (other suitable column sizes may be equally satisfactory) containing polystyrene-divinylbenzene resin maintained at about 60° C. is loaded with about 45 milliliters of aqueous about two molar nitric acid solution containing about 0.1 milligrams thorium-229, trace amounts of actinium-225, and about 3.2 grams of uranium-233 and daughter products. Next about 60 milliliters of aqueous about two molar nitric acid is used to elute uranium, most of the daughter products and non-radioactive impurities. Then about 60 milliliters of aqueous about three molar nitric acid is used to wash out the radium and any remaining cations. Then, about 50 milliliters of about one molar ammonium nitrate (pH 3.9) is passed through the column to change the resin to the ammonium form signified by a color change from light tan to orange brown. Subsequently, purified thorium is separately eluted with about 50 milliliters of about 0.5 molar ammonium acetate (pH 3.9). As the last step, about 50 milliliters of about eight molar nitric acid is used to separately elute the actnium ions. Analysis revealed that about 95% of the thorium-229 originally present in the feed solution is eluted into the ammonium acetate solution while about all of the actinium within detectable limits is eluted into the eight molar nitric acid solution.

Example 3

A resin is charged at ambient temperature with about 100 ml. of feed solution comprising uranium tetrafluoride and about 1.2 molar hydrochloric acid in about 90% by weight methanol. About 150 milliliters of about 1.2 molar hydrochloric acid in methanol is used to elute most of the uranium. If aluminum cations were used to complex the residual fluoride ions, another 150 milliliters of about 1.2 molar hydrochloric acid may be used to remove the aluminum from the resin. The hydrochloric acid may be rinsed away with about 10 milliliters of water. The resin is then heated to about 60° C. and washed with about 50 milliliters of about one molar nitric acid to remove remanent uranium followed by an about 10 milliter water wash. The resin is changed to the ammonium form with about 27 milliliters of about one molar ammonium acetate. Next, about 98% by weight of the thorium is eluted with about 23 milliliter of about one molar ammonium acetate. Most of the remaining thorium may then be removed with about 85 milliliters more of about one molar ammonium acetate. A final elution with about 200 milliliters of about one molar ammonium acetate is used to elute the radium and actinium.

Example 4

After washing the charged resin with hydrochloric acid to elute uranium as described in Example 3 the resin is heated to about 60° C. and washed with about 150 milliliters of two molar nitric acid to remove radium from the resin. Then an about 25 milliliter water wash purges the nitric acid and is followed by about 35 milliliters of about 0.5 molar ammonium acetate to convert the resin to the ammonium form. About 99.9% by weight of the thorium is eluted in about 270 milliliters of ammonium acetate, however, 91% is removed in the first 20 milliliters. An about 15 milliliter water wash removes the ammonium acetate and is followed by about 55 milliliters of about four molar nitric acid to elute actinium with about 99% of the eluted actinium in the first 10 milliliters.

The invention provides a time saving, unitary ion exchange process for separately recovering both thorium and actinium from uranium and uranium daughters. Substantially all of these two valuable radioisotopes may be recovered in separate eluates negating the need for multiple separation processes. Methods are illustrated for loading the cation exchange resin either at ambient or elevated temperatures as well as using alternate elutriants to render the separation process flexible and convenient.

It will be understood that various changes in the details materials and arrangement of the process steps, which have been described and illustrated in order to explain the invention, may be made by those skilled in the art within the scope of the invention as expressed in the claims.

What is claimed is:

1. A process for separation of actinium and thorium from a feed solution of uranium and its decay products including radium, comprising loading a cation exchange resin with said feed solution for absorption onto said resin of said uranium and its decay products including radium and substantially all of said thorium and actinium, eluting first said uranium and its decay products from said cation exchange resin with an about one to two molar acid solution selected from the group consisting of hydrochloric acid and nitric acid until a substantially uranium free eluate is discharged from said resin and substantially all of said radium said thorium and said actinium remains absorbed on said resin, followed by washing said resin with about two to three molar nitric acid until an essentially radium free eluate is discharged from said resin, thereafter washing said resin with an about one-half to one molar ammonia salt solution to change the resin to the ammonium form, subsequently eluting thorium from said resin with an about one-half to one-molar ammonium acetate solution having a pH of about 2.5 to 4.0, and finally eluting actinium from said resin with a solution selected from the group consisting of four to eight molar nitric acid and ammonium acetate.

2. The process of claim 1 wherein said feed solution comprises about one to two molar hydrochloric acid and said cation exchange resin is maintained at ambient temperature during said loading, said resin is purged after elution of uranium and the decay products with distilled water to remove said acid, said resin is washed at about 50° C. to 80° C. with said about two to three molar nitric acid to remove radium from said resin, and said washing to change said resin to the ammonium form comprises washing said resin with distilled water to remove said nitric acid, and washing said resin at about 50° C. to 80° C. with about one-half molar ammonium acetate having a pH of about 3.9.

3. The process of claim 1 wherein said ammonia salt solution is selected from the group consisting of ammonium nitrate and ammonium acetate.

References Cited

UNITED STATES PATENTS 2,723,901  11/1955  Hagemann et al. _____ 23—338

OTHER REFERENCES

Eichel Berger et al.: Mound Lab Progress Report for April 1964, July 10, 1964. Nuclear Science Abstracts, vol. 18, No. 35246.

BENJAMIN R. PADGETT, *Primary Examiner.*

MICHAEL J. McGREAL, *Assistant Examiner.*

U.S. Cl. X.R.

23—343, 345